United States Patent [19]
Ollier et al.

[11] Patent Number: 6,163,639
[45] Date of Patent: Dec. 19, 2000

[54] PASSIVE PROCESS FOR FITTING CONNECTORS TO OPTICAL ELEMENTS WITH AN INTEGRATED OPTICAL CIRCUIT AND TEMPLATE FOR EMBODIMENT OF THE PROCESS

[75] Inventors: Eric Ollier, Grenoble; Nicole Devoldere, Penvenan; Dominique Pavy, Cannion; Sébastien Fontaine, Sainte-Agnes, all of France

[73] Assignee: Commissariat a l'Energie Atomique, Paris, France

[21] Appl. No.: 09/234,845

[22] Filed: Jan. 22, 1999

[30] Foreign Application Priority Data

Jan. 28, 1998 [FR] France ................... 98 00898

[51] Int. Cl.$^7$ .................................. G02B 6/26
[52] U.S. Cl. ................... 385/52; 385/14; 385/53
[58] Field of Search .................. 385/39, 49, 52, 385/59, 65, 83, 14, 53

[56] References Cited

U.S. PATENT DOCUMENTS 4,768,199  8/1988  Heinen et al. .

FOREIGN PATENT DOCUMENTS

| | | |
|---|---|---|
| 217 063 A1 | 8/1986 | European Pat. Off. . |
| 682 276 A1 | 11/1995 | European Pat. Off. . |
| 718 649 A1 | 6/1996 | European Pat. Off. . |
| 798 579 A1 | 10/1997 | European Pat. Off. . |

OTHER PUBLICATIONS

Patent Abstracts of Japan, Pulbication No. 01200307, Publication Date Nov. 8, 1989.
WO 96/10199–ABS Apr. 1996.
WO 96/21875 Jul. 1996.

Primary Examiner—John D. Lee
Assistant Examiner—Sarah N Song
Attorney, Agent, or Firm—Pearne & Gordon LLP

[57] ABSTRACT

The invention relates to a process for fitting connectors to optical elements to an integrated optical circuit (26) consisting of connecting at least one optical element to this circuit such that the outputs and/or inputs of each element are located approximately in the same plane (xoz) as the inputs and/or outputs of this integrated optical circuit (26), also located in the same plane (xoz). This process comprises the following steps:

the circuit (26) is positioned on a template (35) with patterns that enable subsequent precise alignment of optical elements with inputs and/or outputs of the circuit (26);

at least one block (29, 30) capable of holding the optical element(s), is positioned on the template facing the inputs and/or outputs of the circuit (26), and is fixed to the circuit (26);

the template is removed, and the optical element(s) is (are) placed in each block (29, 30) the blocks then being aligned with the inputs and/or outputs of the circuit (26).

14 Claims, 5 Drawing Sheets

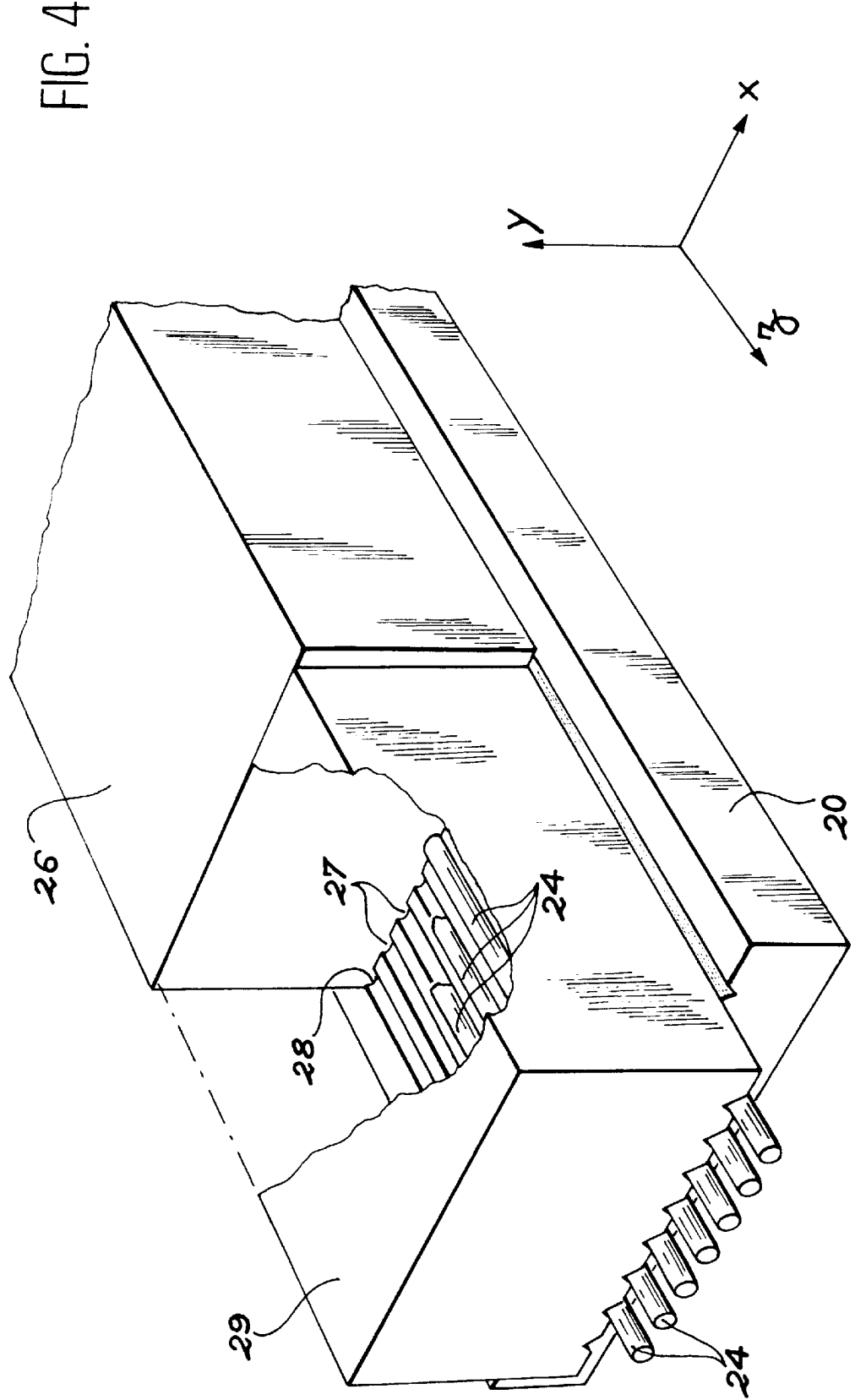

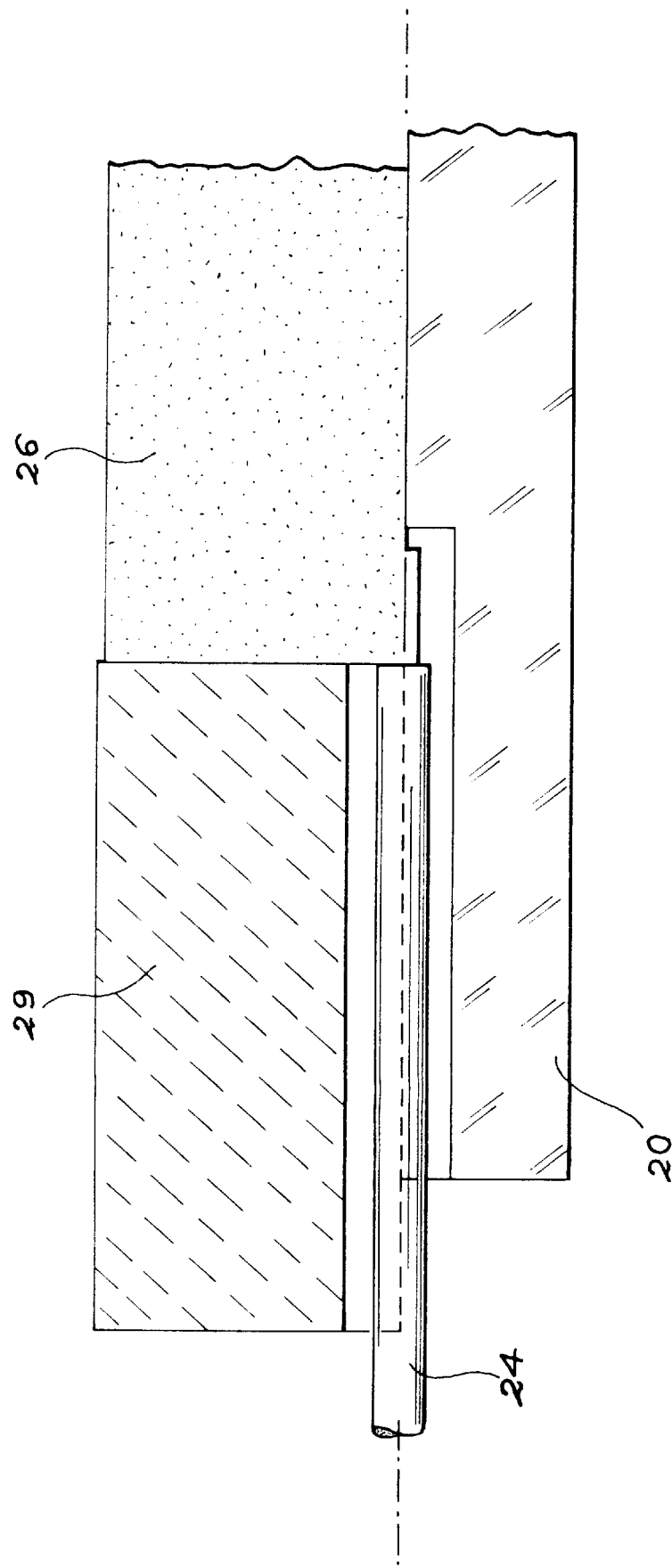

PASSIVE PROCESS FOR FITTING CONNECTORS TO OPTICAL ELEMENTS WITH AN INTEGRATED OPTICAL CIRCUIT AND TEMPLATE FOR EMBODIMENT OF THE PROCESS

DESCRIPTION

1. Technical Domain

This invention relates to a passive process for fitting connectors to optical elements with an integrated optical circuit and a template for embodiment of this process.

2. State of Prior Art

In the field of packaged components, attempts are being made to find technical solutions for reducing the cost of making connectors, which is an important factor in the cost of each component.

The cause of the high cost of connections is thus the need to collectively and very precisely (within less than one micrometer) align a set of optical elements, for example optical fibers facing a set of inputs and/or outputs (for example formed by optical guides) of an optical circuit, in order to minimize coupling losses.

Even if automated active solutions (optimized positioning as a function of the optical transmission in the circuit) are being studied, most research is now being made on passive and collective connection means that have overriding advantages in the attempt to reduce costs.

Existing techniques may thus be classified into three main categories:

- active connectors, corresponding to individual positioning of optical fibers facing microguides, the positioning being optimized by an optical transmission measurement;
- semi-active connectors, corresponding to collective positioning of a set of fibers previously passively aligned with each other, facing microguides, the positioning of the assembly being optimized by an optical transmission measurement;
- passive connectors corresponding to passive positioning, in other words without any optical measurement, of the set of optical fibers facing the set of microguides, this positioning being checked by mechanical marks made on the integrated optical circuit and/or possibly on an additional motherboard, in order to contain the optical fibers.

The rest of this description is concerned only with passive connectors which, because the steps involved in making connectors are easy, has overriding advantages in achieving low cost objectives. The main existing passive connector solutions are as follows:

A—"Flip-chip" type solutions

These solutions consist of turning the integrated optical circuit over onto a motherboard, for example made of silicon ("Silicon MotherBoard"), on which patterns, frequently "V-grooves" are formed and which will contain optical fibers. With these solutions, precision alignment patterns have to be made both on the integrated optical circuit and on the reception motherboard. Furthermore, alignment patterns made on the integrated optical circuit must be perfectly positioned with respect to the microguides.

These silicon V-grooves may be made using known wet etching techniques on crystalline silicon planes as described in many articles, for example in document reference [1] at the end of the description. One of these techniques consists of depositing an Si3N4 nitride layer on an oriented silicon substrate. A photolithography step then etches this nitride mask by making patterns aligned along crystalline planes in the silicon. The V-grooves are then etched by dipping the board in a KOH bath which selectively etches the silicon along the crystalline planes.

The main manufacturing difficulty lies in alignment of the photolithography level in order to make the nitride mask using crystalline planes in the silicon. The quality of the V-grooves (smooth surfaces without offsets), and particularly their geometry (width, depth) depend on the precision of this alignment. Particular methods have already been proposed in the literature for optimizing this alignment, particularly in documents reference [2] and [3].

These "flip-chip" type solutions may be improved in several ways. Thus, document reference [4] describes a first example which shows that an integrated optics technology may be adapted in order to make positioning patterns on the integrated optical circuit self-aligned with the microguides. This document also describes how to use mechanical stops self-aligned with wave guide bushings on an integrated optical circuit, for positioning along x, with different microguide structures. The direction x is in the plane of the layers of the integrated optical circuit and is perpendicular to the wave guide axes. But nevertheless precision V-grooves must be made for each component on the silicon motherboard in order to obtain good alignment perpendicular to the plane of the layers.

B—"Monolithic" type solutions

These solutions consist of etching optical fiber positioning patterns directly on the integrated optical circuits themselves, facing the optical guides. A single board is thus made. These solutions prevent parasite curvature of integrated optics chips. The main difficulties with these solutions are in etching precision patterns on the integrated optics board, and their alignment with the photolithography level used to make the microguides.

There are generally two types of etched patterns:

"precision" V-grooves obtained by direct etching on the integrated optical circuit facing the optical guides. The NEC Corporation has developed this solution by improving the design of the fiber positioning V-grooves to make it more independent of the precision with which the photolithography mask is oriented with respect to the crystalline planes, as described in document reference [5]. However, the difficulty of making precision V-grooves on each chip is unchanged and the difficulty in aligning the "microguide" level with respect to the "V-groove" level is unchanged. Furthermore the nature of the mask, used to determine the etching areas of the V-grooves and made before the silica layers are deposited, imposes conditions on deposit parameters and any heat treatment;

U grooves obtained by direct etching (for example etching of SiO2 and Si) on the integrated optical circuit facing the optical guides, as described in document reference [6]. A reference plane in x needs to be accurately positioned with respect to the optical guides if this method is to be applied to disconnectable multi-fiber connectors. But this depends not only on the alignment of the photolithography levels, but also on the quality of the deep etching of the silica that must be well controlled. Finally, etching of a cavity in the silicon must be uniform over the board and must be controlled by an in-situ system installed in the etching equipment.

C—other solutions

Other solutions have been proposed elsewhere.

For example, note the use of an intermediate part for guiding the fiber layer assembly with respect to the integrated optical circuit. Precision patterns are then necessary both on the integrated optical circuit and on the intermediate part. The NTT company uses this technique to connect integrated optical circuits to fiber layers using the MT connectors standard as described in document reference [7]. FIGS. 1 and 3a in this publication clearly show the principle of this solution. The intermediate part made by molding techniques and compatible with the MT connector is positioned with respect to the integrated optical circuit by means of precision pins trapped between the V-grooves made on the integrated optical circuit and V-grooves made on the intermediate part. The assembly is then glued. The fiber layer contained within a connector plug is guided on the intermediate part by guide pins. This method requires perfect control of molding techniques and very precise control over the following parameters:

- on the integrated optical circuit: etching of precision V-grooves and positioning of the V-grooves with respect to the microguides;
- on the intermediate part: manufacturing of precision V-grooves by molding techniques and positioning of the V-grooves with respect to the guide holes;
- on the MT plug: positioning of the fibers with respect to the guide holes;
- between the MT plug and the intermediate part: the geometry of the guide holes and pins;
- differential expansion of the various elements made of different materials.

There are a number of common critical points for these various solutions, in addition to the individual difficulties mentioned for each of the solutions defined above.

Most of the solutions presented above require that mechanical marks are etched on the integrated optics chip, these marks must be positioned very precisely with respect to the optical guides. Therefore this precision depends on the alignment of the two photolithography levels (etching of microguides and etching of marks) and on the control over dimensions during etching, and are sources of major uncertainties. Therefore, a method needs to be found that can be used to obtain mechanical marks self-aligned with the optical guides.

In the current state of the art, all "flip-chip" type solutions require a very precise motherboard (for example a silicon chip with V-grooves) for each integrated optical circuit for which connectors have to be made. This has a very negative effect on the cost of manufacturing the component on which connectors are to be made, due to technological difficulties encountered in making these precision motherboards. For example in the case of silicon V-grooves, it is possible to obtain good control over a given pitch and a precise relative height between the V-grooves (which depends on the uniformity of the etching). However, it is much more difficult to control the absolute value of the depth of the V-grooves since this depth depends on the alignment of the photolithography level with crystalline planes in the silicon. This makes manufacturing of the precision V-grooves difficult and therefore expensive. Therefore, a method needs to be found for making connectors that avoids the systematic use of high precision motherboards for each component on which connectors are to be made, in order to reduce the cost of the final component.

Etching of V-grooves on the integrated optical circuit (silicon substrate) is elegant, since it combines the advantages of a monolithic solution (only one board made, no problem of parasite curvature of the chip, minimum manipulation during assembly) and advantages of V-grooves for positioning of optical fibers. Unfortunately, this solution has the classical disadvantages of the previous solutions: the need to make precision V-grooves on each chip (cost related to the technological difficulty) and the difficulty of accurately aligning the two levels ("microguides" and "V-grooves") with respect to the crystalline planes in the silicon. Furthermore, technological stacking is relatively difficult and makes it necessary to etch the entire silicon layer, considering the quality of the optical outputs.

The purpose of the invention is to solve these various problems by proposing a passive process for fitting connectors to optical elements with an integrated optical circuit and a template for embodiment of this process, which are both precise and inexpensive.

DESCRIPTION OF THE INVENTION

The process according to the invention, which consists of connecting one or several optical elements to an integrated optical circuit such that the outputs and/or inputs of each element are located approximately in the same plane (xoz) as the inputs and/or outputs of this circuit, also located in the same plane (xoz), comprises the following steps:

- the circuit (possibly with mechanical marks) is positioned on a template with patterns that enable subsequent precise alignment of optical elements with circuit inputs and/or outputs;
- at least one block capable of holding the optical element (s), is positioned on the template facing the circuit inputs and/or outputs, and is fixed to this circuit;
- the template is removed, possibly for subsequent reuse, and the optical element(s) is (are) placed in each block, these blocks then being aligned with the circuit inputs and/or outputs.

The said precise alignment is advantageously made along three directions, for example perpendicular directions (Ox, y, z coordinate system).

The optical elements may be any passive or active optical (opto-electronic) component or circuit, and for example may be optical fibers, laser diodes, photodiodes, optical amplifiers, optical modulators, etc.

In the case of optical fibers, the template is beneficially a "precision" template (V-grooves in which the pitch, relative height and absolute height are well controlled) comprising a board equipped with a part capable of containing the optical circuit and at least one row of parallel precision V-grooves, in which a set of calibrated optical fibers are placed. A "calibrated optical fiber" is an optical fiber of the same type as the optical fibers to be connected.

Each block is a "non-precise" block of V-grooves composed of a board equipped with a row of parallel V-grooves on its lower surface that is positioned on the calibrated optical fibers positioned on the V-grooves of the template.

Advantageously, the circuit is positioned on the template using at least one mechanical mark on the integrated optical circuit and at least one complementary mechanical mark on the template. The mechanical mark on the circuit advantageously consists of a bushing self-aligned with a wave guide on this circuit. This may be done using a non-functional wave guide made at the same time as the other wave guides on the optical circuit, this guide forming an excellent mechanical mark perfectly aligned with the optical guides.

Advantageously, the complementary mechanical mark on the template is formed by a "V-groove".

In one example embodiment, the said process comprises the following steps:

- at least one set of calibrated optical fibers are placed, and possibly fixed for example by gluing, in the V-grooves of a board equipped with a part capable of holding the optical circuit, and at least one row of parallel precision V-grooves in order to form the template;

the integrated optical circuit is positioned, the circuit being provided with inputs and/or outputs on its lower surface to be aligned with the set(s) of optical fibers, and at least one mechanical mark on the part of the template on which the circuit will be fitted;

at least one block equipped with a row of parallel V-grooves on its lower surface and designed to be positioned on the calibrated optical fibers of the template located facing the circuit inputs and outputs, corresponding to the rows of the V-grooves of this template, is put into position and is fixed to the circuit, for example by gluing;

the template is removed, and may possibly be reused later;

the product composed of the integrated optical circuit and the blocks of V-grooves fixed to the circuit is placed in line with its inputs and/or its outputs in a connector designed to contain and possibly press optical fibers in the V-grooves of the blocks.

Advantageously, the circuit is positioned on the template in two sub-steps:

the circuit is positioned approximately on the template; and the circuit is mechanically translated on the template until contact is made with the complementary mechanical marks, which positions the circuit with respect to the template.

This invention also relates to a template for embodiment of this process.

This template may have very different patterns, depending on the type of application being considered. In the special case of connecting optical fibers, the template patterns are advantageously precision-made "V-grooves". Calibrated fibers are placed inside these V-grooves. This template then comprises:

a board on which these precision V-grooves are made;

at least one set of calibrated optical fibers positioned in precision V-grooves corresponding to inputs and/or outputs of the integrated optical circuit.

For example, the board may be made of silicon, quartz or a ceramic material.

In general, the definition of the term "V-groove" corresponds to a recessed shape, possibly but not necessarily with straight walls.

The configuration for the process according to the invention can only be obtained by two methods: either by active alignment, or passively which necessarily requires the use of an assembly part that acts as a "template". This configuration is very different from a "flip-chip" type solution since in the final product, the integrated optical circuit is not in contact with the upper surface of the blocks of V-grooves. The three elements (block of V-grooves, integrated optical circuit, block of V-grooves) are all aligned with each other.

The process according to the invention as described above provides the following advantages.

Alignment of the superstrate bushings located above the wave guides of the integrated optical circuit as a lateral and angular mechanical reference is perfect because these bushings are the direct result of the existence of these wave guides. The positioning is independent of alignment of photolithography levels or over-etching. Therefore the process according to the invention is very advantageous compared with known solutions that consist of etching a mechanical reference in the silica after carrying out the technological step corresponding to the optical guides. In the process according to the invention, all that has to be well controlled is the quality of the covering deposit (covering thickness and factor).

The process according to the invention can result in a cost reduction, since no additional steps are necessary to make a bushing, or to make an additional reference surface on the circuit. This mechanical reference is obtained at the same time as the microguides are made.

The precision transfer principle (template) avoids the need to use blocks with precision (and therefore expensive) V-grooves for each integrated optical component on which connectors are to be made. The use of a high precision template, which can be very expensive since it is used to install a large number of integrated optics components, means that non-precise (and therefore inexpensive) blocks of V-grooves may be used to install each integrated optics component.

Furthermore, the product obtained using the process according to the invention can be used to connect and disconnect optical elements as necessary.

Finally, the fact that the product obtained using the process according to the invention can be assembled and disassembled, means that connections with optical elements can be made directly on an industrial site, and therefore the product can be replaced directly on site if necessary.

Figure 2:
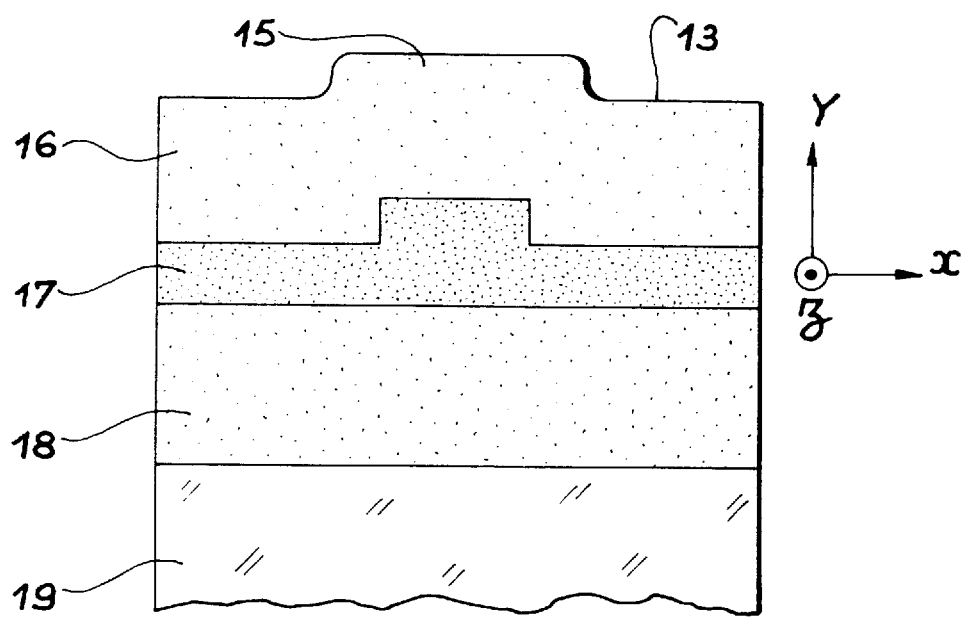
Figure 3:
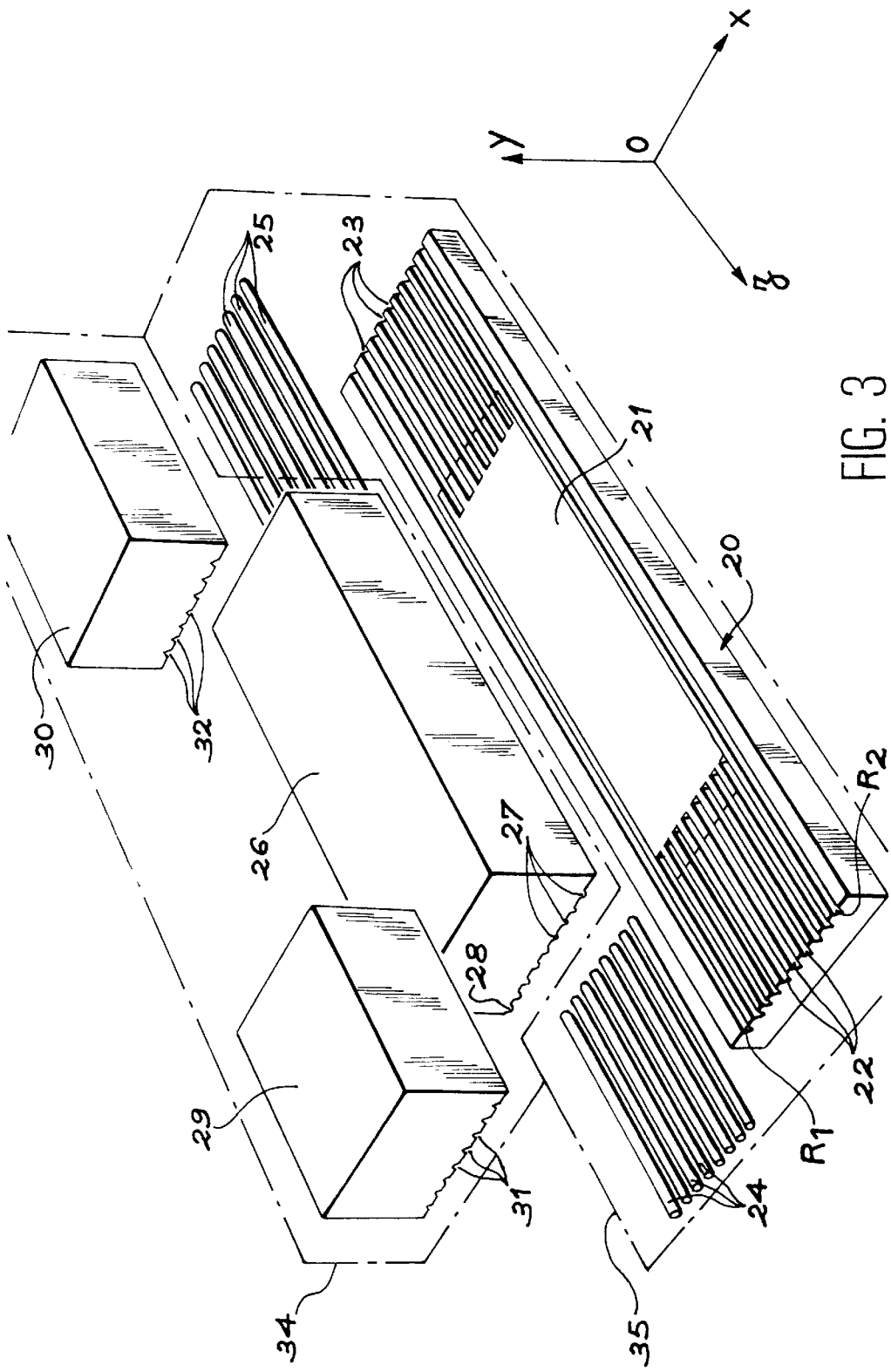
Figure 5B:
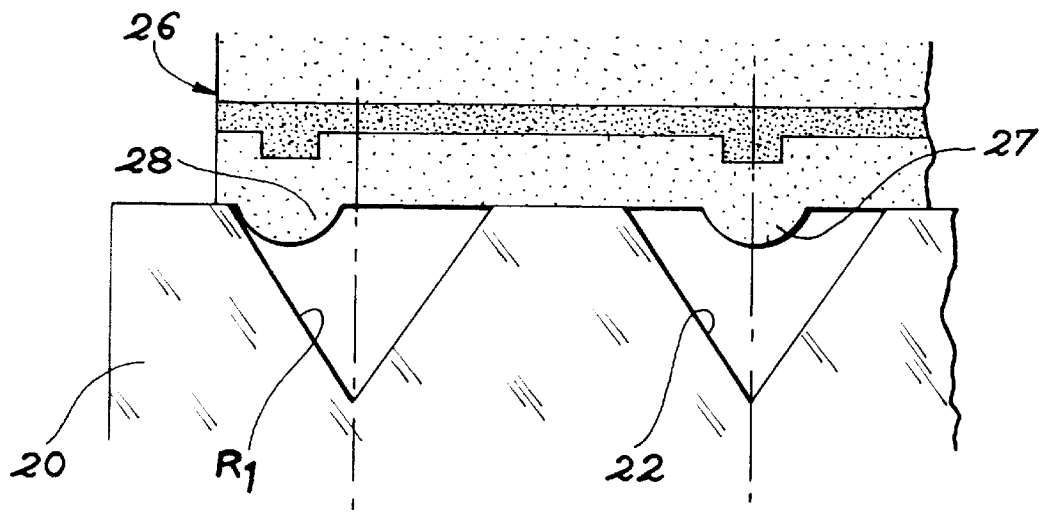
Figure 5C:
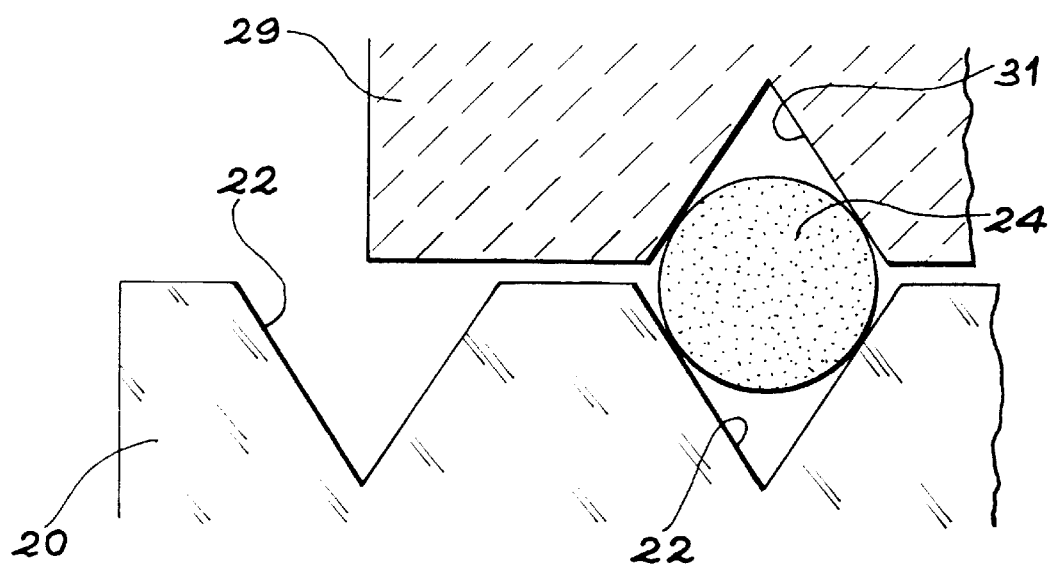

p=pitch ho=absolute height $\Delta h$=relative height between V-grooves;

FIG. 2 illustrates the layout of an optical guide comprising a mechanical bushing;

FIG. 3 illustrates the steps in the process according to the invention;

FIG. 4 illustrates a detailed view of the alignment with a template using the process according to the invention;

FIGS. 5A to 5C contain one longitudinal section and two cross-sections respectively, showing the alignment of the input and/or output wave guides of the integrated optical circuit, and calibrated optical fibers placed in the V-grooves of the template using the process according to the invention.

DETAILED DESCRIPTION OF EMBODIMENTS

Figure 1:
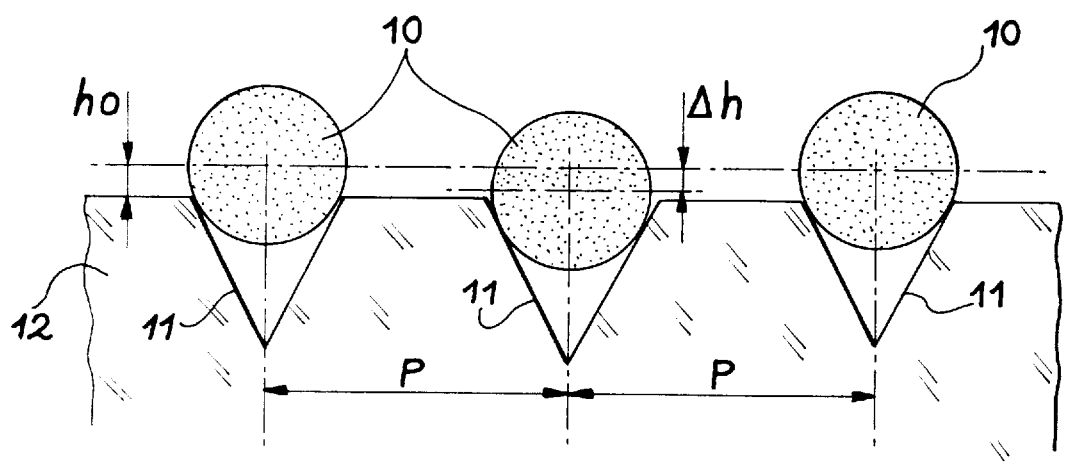
FIG. 1 illustrates the positioning of optical fibers in the V-grooves of a board and defines the geometric characteristics of the V-grooves.

FIG. 1 illustrates the positioning of optical fibers 10 in V-grooves 11 formed in a board 12.

In the rest of the description,

"precision V-groove" means a set of V-grooves in which the pitch p (distance between adjacent V-grooves), the relative height $\Delta h$ (difference in height between adjacent V-grooves) and the absolute height ho are well controlled, the absolute height being the distance between the upper surface of the board 12 and the center line of a fiber with reference 10 with a known diameter placed in a V-groove 11;

"non-precision V-groove" is a set of V-grooves in which only the pitch p and the relative height $\Delta h$ are well controlled, the absolute height ho, which is technically the difficult point to be obtained, is then not necessarily well controlled, so that these "non-precise" elements can be made at low cost.

The objective of the process according to the invention is to connect one or several sets of optical elements, for example one or two flat optical fiber cables (this application will be used as an example throughout the rest of the text), to the inputs and/or outputs of an integrated optical circuit, and it has several advantageous characteristics:

blocks, for example made of silicon, are used to hold the flat optical fiber cables in position facing the input and output optical guides on the integrated optical circuit;

a precision transfer (template) is used in which the position of the integrated optical circuit with respect to the fiber support blocks is mechanical, and therefore passive from the optical point of view. This principle avoids the need to use blocks containing precision V-grooves for each component for which integrated optical connectors have to be made. The use of a precision template means that non-precise (and therefore inexpensive) fiber support blocks can be used to install each integrated optical component;

mechanical marks are used on the integrated optical circuit to position this circuit on the template. For example, these marks may consist of bushings 15 on the superstrate 16 located above the wave guides 17 of this circuit, as shown in FIG. 2. These marks are then perfectly aligned with the optical guides since they are the consequence of the existence of the optical guides (coverage of the step). For example, FIG. 2 shows the substrate 19 (for example made of silicon), a first layer 18 (for example made of silica), and an etched guide layer 17, the covering layer or superstrate 16, with the bushing 15. In another embodiment of this wave guide, it would be possible to etch the superstrate instead of the guide layer. In the process according to the invention, an non-functional wave guide could advantageously be made at the same time as the wave guides for the optical circuit (same photolithography level). This guide then forms an excellent mechanical mark perfectly aligned with the optical guides.

According to one embodiment of the process according to the invention, as illustrated in FIGS. 3 and 4:

two sets of calibrated optical fibers 24 and 25, possibly but not necessarily of the same type as those to be connected in the V-grooves of a board 20 equipped with a part that will hold the optical circuit and which, in this example, has a flat central part or is in the form of a "dish" 21, and two rows of parallel V-grooves 22 and 23 at its two ends, thus forming a template 35 (in FIG. 3, the template has two mechanical marks R1, R2 to position the optical circuit, which are V-grooves on each side of the two rows 22 and 23 designed to position the blocks 29 and 30) are positioned and possibly fixed;

the integrated optical circuit 26 is placed on template 35, the circuit comprising inputs and/or outputs 27 on its lower surface to be aligned with the two sets of optical fibers, and possibly an alignment guide 28 to be placed in R1;

the optical circuit is translated mechanically on the template until coming into contact with the necessary references, namely 28 on the wall of R1, which positions the circuit with respect to the template;

two blocks 29 and 30 are positioned, each equipped with a row of parallel V-grooves 31 (32) on their lower surfaces, which will fit on the calibrated optical fibers fixed in the template facing the circuit inputs and outputs, corresponding to the rows of V-grooves 22 and 23 on the template, and they are fixed to the said circuit;

the template 35 is removed, and can be reused later;

the final product 34 is put into position, and consists of the integrated optical circuit 26 and the two blocks of non-precise V-grooves 29 and 30 fixed to the two ends of the integrated optical circuit aligned with the input and output optical guides, in a connector which will hold and possibly press the optical fibers to be connected in the V-grooves of the two blocks.

The two block of V-grooves 29 and 30 are thus designed to hold the optical fibers to be connected, once the assembly has been positioned in the connector, these fibers are then aligned with the circuit inputs and/or outputs. The template is only used to fit all the three previous parts 26, 29 and 30 together precisely.

The template 35 used during assembly, is thus composed of three main elements:

the board 20, for example made of silicon, on which the precision V-grooves 22 and 23 and the mechanical marks for positioning the circuit, are made;

the first set of calibrated optical fibers 25 (for example with a diameter of 125 μm) fixed in the precision V-grooves and corresponding to the inputs and/or outputs of the integrated optical circuit 26;

the second set of calibrated optical fibers 24 (for example with a diameter of 125 μm) fixed in the precision V-grooves and corresponding to the inputs and/or outputs of the integrated optical circuit 26;

The following particular points need to be controlled on these various parts:

for the integrated optical circuit 26: only the thickness of the superstrate and the reproducibility of the coverage of etched steps;

for each block 29 and 30: the pitch and the relative height of the V-grooves;

for the board 20: the pitch, relative height and absolute height of the V-grooves (22, 23, R1, R2).

The mechanical marks on the blocks of V-grooves 29 and 30 are the sides of the V-grooves. On the integrated optical circuit 26, the mechanical marks are the upper surface of the superstrate 13 (FIG. 2) and the bushings 27 and 28 generated on the surface of the superstrate by the coverage (superstrate) of the previously etched wave guides. These mechanical marks control the vertical and lateral positioning of the blocks of V-grooves 29 and 30 and the integrated optical circuit 26, as shown in FIGS. 5A to 5C. FIG. 5B shows that the lateral positioning (x) is controlled by the stop 28 along the side of the "V-groove" R1. FIG. 5C shows that the block 29 is not in contact with the surface of the template since the mechanical reference is the fiber. Longitudinal positioning (axis of the fibers or guides) is achieved by contact between parts 29, 30 and 26 which are then fixed together, for example by gluing.

Within the framework of the invention, the "non-precise" blocks of V-grooves 29 and 30 may be made in a conventional manner since there is no need to control the absolute depth of the V-grooves. The template must be made so that a few components with a well defined absolute depth can be produced. Precise alignment techniques could be used to improve yield. But it will also be possible to use conventional techniques, provided that modifications are made on the mask (different widths of V-groove openings) in order to compensate for alignment errors with respect to the crystallographic planes. The yield is then lower, but note that the objective is to obtain only a few templates with the required characteristics, even if this means that a large number has to be made, since these templates are reused many times to make a large number of components with connectors.

A large number of alternative embodiments are possible within the scope of this invention. Thus, several types of mechanical marks may be used on the template:

precision V-grooves (as described above);

U grooves, which may be made by different methods such as silica etching, silicon etching, laser machining, etc.;

precision steps;

an impression of the surface of the superstrate of an integrated optical circuit;

optical fibers or any other type of calibrated pins, put into contact and fixed in the V-grooves or U grooves;

precision balls, put into contact and fixed in the V-grooves or U grooves;

Mechanical marks on the circuit may be:

the bushings of the functional guides;

the bushing of an additional positioning guide without an optical function;

the upper surface of the superstrate (at the top or at the bottom of the guides);

the guides, removed from their superstrate;

or any other type of stop.

Materials other than silicon may be used for the template, such as plastic (molding), ceramic, glass or other, etc.

The bushing characteristic of the presence of an optical guide may possibly be obtained by an integrated optics technology other than the silicon technology.

The process according to the invention may also be applied to align other optical components, for example any passive or active optical (opto-electronic) component or circuit, including optical fibers, laser diodes, photodiodes, optical amplifiers, optical modulators, etc.

In one example embodiment, the integrated optical circuit is 1→8 divider with 8 channels at a spacing of 250 μm. It is deposited on the template while holding the mechanical stop of the bushing of an additional guide (right guide) in contact with one side of the V-groove on the template. This stop was made for a bushing height equal to 2.5 m.

The blocks of V-grooves (eight V-grooves at a spacing of 250 μm) are deposited on the template using the mechanical marks controlling lateral and vertical alignments (calibrated optical fibers). They are then brought closer to the integrated optical circuit until contact is achieved and they are then fixed to it, for example by gluing.

The assembly consisting of the 1→8 divider and the two blocks of V-grooves is then placed in a connector designed to hold the plugs supporting the flat cables with eight optical fibers in input and output.

For example, the invention may use the etching technique described previously to make the V-grooves: in particular, see documents reference [1], [2] and [3], depending on the required precision.

REFERENCES

[1] "Silicon As A Mechanical Material" by K. E. Petersen (Proceedings of the IEEE, Volume 70, No. 5, May 1982)

[2] "An Improved Method To Align Etchmasks To The <110> Orientation" by H. Schröder, O. Dorsch and E. Obermeier ("5$^{th}$ International Conference On Micro Electro Opto Mechanical Systems And Components", Postdam, Sep. 17–19, 1996)

[3] "High Precision Wafer Orientation For Micromachining" by A. Steckenborn, T. Winckler, G. Jantke, F. Arndt and H. F. Schlaak ("Micro System Technologies 91", pages 467–471 (1991))

[4] "Silica On Si Waveguides for Self-Aligned Fibre Array Coupling using flip-chip Si V-Groove Technique" by Q. Lai, W. Hunzicker and H. Melchior ("Electronics Letters"), Sep. 26, 1996, volume 32, No. 20)

[5] "Silica Based Optical Waveguide Devices, with Novel Fiber Guide Structure for Alignment-Free Fiber Coupling" by N. Kitamura, S. Mizuta, T. Shimoda and M. Kitamura ("Integrated Photonics Research 96", Apr. 29, 1996, 1996 Technical Digest Series, Volume 6, pages 608–611)

[6] "Fiber Pigtailed Wavelength Multiplexer/Demultiplexer at 1.55 Microns Integrated on Silicon Substrate" by G. Grand, J. P. Jadot, S. Valette, H. Denis, A. Fournier and A. M. Grouillet ("7$^{th}$ Annual European Fibre Optic Communications and Local Area Network Conference", EFOC-LAN 90, Munich (D), pages 108–113, Jun. 25–29, 1990)

[7] "An Easily-Assembled Optical Device for Coupling Single-Mode Planar Waveguides to a Fiber Array" by M. Takaya, M. Kihara and S. Nagasawa ("Integrated Photonics Research 96", Apr. 29, 1996, 1996 Technical Digest Series, Volume 6, pages 561–564)

We claim:

1. Process for fitting connectors to optical elements to an integrated optical circuit (26) consisting of connecting at least one optical element to this circuit such that the outputs and/or inputs of each element are located approximately in the same plane (xoz) as the inputs and/or outputs of this circuit, also located in the same plane (xoz), characterized in that it comprises the following steps:

the circuit (26) is positioned on a template (35) with patterns that enable subsequent precise alignment of optical elements with inputs and/or outputs of the circuit (26);

at least one block (29, 30) capable of holding the optical element(s), is positioned on the template (35) facing the inputs and/or outputs of the circuit (26), and is fixed to this circuit (26);

the template (35) is removed, and the optical element(s) is (are) placed in each block (29, 30) the blocks then being aligned with the inputs and/or outputs of the circuit (26).

2. Process according to claim 1, in which the said precise alignment is made along three directions.

3. Process according to claim 1, in which the said optical elements are optical fibers.

4. Process according to claim 1, in which the optical elements are active components.

5. Process according to claim 1, in which the optical elements are integrated optical circuits.

6. Process according to claim 3, in which the template is a precision template comprising a board (20) equipped with a part (21) capable of holding the optical circuit and at least one row of parallel precision V-grooves (22, 23), in which a set of calibrated optical fibers (24, 25) is placed.

7. Process according to claim 6, in which each block is a block of non-precise V-grooves (29, 30) composed of a board equipped with a row of parallel V-grooves (31 or 32) on its lower surface capable of being positioned on the calibrated optical fibers (24, 25) positioned on the V-grooves (22, 23) of the template (35).

8. Process according to claim 1, in which the circuit (26) is positioned on the template (35) using at least one mechanical mark on the integrated optical circuit and at least one complementary mechanical mark on the template.

9. Process according to claim 8, in which each mechanical mark on the circuit consists of a bushing (15) self-aligned with a wave guide (17) of this circuit.

10. Process according to claim 8, in which the complementary mechanical mark on the template consists of a "V-groove".

11. Process according to claim 8, in which a non-functional wave guide made at the same time as other wave guides on the circuit (26) is used, this guide comprising a mechanical mark perfectly aligned with the optical guides.

12. Process according to claim 3, consisting of the following steps:

- at least one set of calibrated optical fibers (24 and 25) are placed in the V-grooves of a board (20) equipped with a part (21) that will hold the optical circuit and at least one row of parallel precision V-grooves (22, 23), thus forming a template (35);
- the integrated optical circuit (26) is put into position, comprising inputs and/or outputs on its lower surface to be aligned with the set(s) of optical fibers, and at least one mechanical mark on the part (21) of the template (35) that will hold the circuit;
- at least one block (29 and 30) is put into position, each block being equipped with a row of parallel V-grooves (31, 32) on its lower surface, which will fit on the calibrated optical fibers (24, 25) of the template (35) facing the circuit inputs and outputs, corresponding to the rows of V-grooves (22, 23) on this template, and they are fixed to the circuit (26);
- the template (35) is removed;
- the product consisting of the integrated optical circuit (26) and the block(s) of V-grooves (29, 30) fixed to the circuit are put into position aligned with the inputs and/or outputs of the circuit, in a connector designed to hold the optical fibers to be connected in the V-grooves of these blocks.

13. Process according to claim 12, in which the circuit is positioned on the template in two sub-steps:

- the circuit is placed approximately in its position on the template; and
- the circuit is translated mechanically on the template until it comes into contact with the complementary mechanical marks, which positions the circuit with respect to the template.

14. Template for using the process according to any one of claims 1 to 13, comprising:

- a board (20) on which precision V-grooves (22, 23) are made;
- at least one set of calibrated optical fibers (24) positioned in the precision V-grooves and corresponding to the inputs and/or outputs of the integrated optical circuit (26).

* * * * *